United States Patent
Gruper et al.

(10) Patent No.: US 7,636,943 B2
(45) Date of Patent: Dec. 22, 2009

(54) METHOD AND SYSTEM FOR DETECTING BLOCKING AND REMOVING SPYWARE

(75) Inventors: Shimon Gruper, Haifa (IL); Yanki Margalit, Ramat-Gan (IL); Dany Margalit, Ramat-Gan (IL)

(73) Assignee: Aladdin Knowledge Systems Ltd., Tel Aviv (IL)

( * ) Notice: Subject to any disclaimer, the term of this patent is extended or adjusted under 35 U.S.C. 154(b) by 759 days.

(21) Appl. No.: 11/150,172

(22) Filed: Jun. 13, 2005

(65) Prior Publication Data
US 2006/0282890 A1 Dec. 14, 2006

(51) Int. Cl.
*G06F 11/00* (2006.01)
(52) U.S. Cl. .............................. 726/22; 726/23; 726/24
(58) Field of Classification Search .................. 726/23, 726/24, 25, 22
See application file for complete search history.

(56) References Cited

U.S. PATENT DOCUMENTS

| | | | |
|---|---|---|---|
| 2002/0144129 | A1 | 10/2002 | Malivanchuk |
| 2002/0147915 | A1 | 10/2002 | Chefalas et al. |
| 2002/0194489 | A1 | 12/2002 | Almogy |
| 2003/0037138 | A1 | 2/2003 | Brown |
| 2005/0091514 | A1 | 4/2005 | Fukumoto |

OTHER PUBLICATIONS

Measurement and Analysis of Spyware in a University Environment, Saroiu et al., Mar. 31, 2004.*
I told you so blog, from www.aladdin.com, as printed out in 2008.*
Simon Gruper, from www.aladdin.com, as printed out in 2008.*
"Blue Coat/Intermute Unveil Gateway Anti-Spyware" The Free Library Dec. 1, 2004.*
Jonathan Hassell, How Fireworks Work, Connected Home Magazine, Jun. 14, 2001.*
PAL Computer Surveillance System, Jul. 20, 2004.*
SpyCon: Emulating User Activities to Detect Evasive Spyware; Chandrasekaran, M.; Vidyaraman, S.; Upadhyaya, S.; Performance, Computing, and Communications Conference, 2007. IPCCC 2007. IEEE Internationa Apr. 11-13, 2007 pp. 502-509.*
Klassp: Entering Passwords on a Spyware Infected Machine Using a Shared-Secret Proxy; Florencio, D.; Herley, C.; Computer Security Applications Conference, 2006. ACSAC '06. 22nd Annual Dec. 2006 pp. 67-76.*
Examining Web-Based Spyware Invasion with Stateful Behavior Monitoring; Ming-Wei Wu; Sy-Yen Kuo; Dependable Computing, 2007. PRDC 2007. 13th Pacific Rim International Symposium on Dec. 17-19, 2007 pp. 275-281.*

* cited by examiner

*Primary Examiner*—David Y Jung
(74) *Attorney, Agent, or Firm*—Mark M. Friedman

(57) ABSTRACT

In one aspect, the present invention is directed to a method for detecting spyware activity, the method comprises the steps of: monitoring outgoing communication data sent from a user's computer; searching for predefined keywords within the communication data; indicating spyware activity in the user's computer by presence of at least one of the predefined keywords within the communication data, the keywords are selected from a group comprising: a signature of the spyware, personal information of the user, an addressee to where the communication data is sent. The method may further comprise: upon detecting a spyware activity in the user's computer, blocking communication from the computer. The method may further comprise removing the spyware. The blocking can be carried out at the user's computer, at the gateway to which the user's computer is connected, etc.

18 Claims, 4 Drawing Sheets

```
GET /cgi-bin/feedback.cgi?
sys_id=3038e55&uname=5.1.2600.Service+Pack+2&version=12ð0=10.8.11.212&port0=21046&port1=18870 HTTP/1.0

Host: www.ovxeateas.biz

HTTP/1.0 200 OK

Server: thttpd

Content-Type: text/plain

Date: Mon, 28 Mar 2005 08:29:35 GMT

Last-Modified: Mon, 28 Mar 2005 08:29:35 GMT

Accept-Ranges: bytes

Connection: close

Content-Length: 10

… # METHOD AND SYSTEM FOR DETECTING BLOCKING AND REMOVING SPYWARE

FIELD OF THE INVENTION

The present invention relates to the field of spyware. More particularly, the invention relates to a method and system for detecting and removing spyware.

BACKGROUND OF THE INVENTION

The term Spyware refers in the art to a software that gathers user information through the user's Internet connection without the knowledge of a user thereof.

The source of Spyware applications is usually freeware or shareware programs that can be downloaded from the Internet. Also licensing agreements that accompany software downloads sometimes warn the user that a spyware program will be installed along with the requested software, but the majority of the users ignore such warnings, and let the spyware to be installed in their computer.

Once installed, the spyware monitors user activity on the Internet and transmits that information in the background to someone else, usually a malicious object. Spyware can gather information about email addresses, passwords, credit card numbers, browsing habits, and actually every activity that is made on the user's computer. They have the ability to monitor keystrokes, to scan files on the hard drive, to snoop other applications such as chat programs or word processors, to install other spyware programs, read cookies, etc.

In addition to violating ethics and privacy, spyware uses the user's computer memory resources and communication bandwidth as it sends information back to the spyware's home base via the user's Internet connection. Because spyware is using memory and system resources, the applications running in the background can lead to system crashes or general system instability.

It is an object of the present invention to provide a method and system for detecting spyware activity at a user's computer.

It is another object of the present invention to provide a method and system for blocking spyware activity at a user's computer.

It is a further object of the present invention to provide a method and system for removing spyware from a user's computer.

Other objects and advantages of the invention will become apparent as the description proceeds.

SUMMARY OF THE INVENTION

In one aspect, the present invention is directed to a method for detecting spyware activity, the method comprises the steps of: monitoring outgoing communication data sent from a user's computer; searching for predefined keywords within the communication data; indicating spyware activity in the user's computer by presence of at least one of the predefined keywords within the communication data, the keywords are selected from a group comprising: a signature of the spyware, personal information of the user, an addressee to where the communication data is sent. The method may further comprise: upon detecting a spyware activity in the user's computer, blocking communication from the computer. The method may further comprise removing the spyware. The blocking can be carried out at the user's computer, at the gateway to which the user's computer is connected, etc.

According to a preferred embodiment of the invention, blocking spyware is carried out by removing at least one process of the spyware. According to another embodiment of the invention, blocking spyware is carried out by preventing forwarding data sent from the spyware to a destination thereof.

According to a preferred embodiment of the invention, removing the spyware is carried out by identifying the spyware; deleting the processes of the spyware; removing registry entries used by the spyware, and optionally, removing the files of the spyware from the user's computer.

According to one embodiment of the invention at least one of the keywords is a bait keyword.

According to one embodiment of the invention, removing spyware is carried out by an agent operative at the user's computer. According to another embodiment of the invention, removing spyware is carried out by an administrator from a remote location.

In another aspect, the present invention is directed to a system for detecting spyware activity, the system comprising: means for monitoring outgoing communication data sent from a user's computer; means for searching predefined keywords within the communication data; means for indicating spyware activity in the user's computer by presence of at least one of the predefined keywords within the communication data, the keywords are selected from a group comprising: a signature of the spyware, personal information of the user, an addressee to where the communication data is sent. The system may further comprise means for blocking communication from the computer upon detecting a spyware activity in the user's computer.

According to one embodiment of the invention the means for blocking is disposed at the user's computer. According to another embodiment of the invention the means for blocking is disposed at a gateway to the network to which the user's computer is connected.

The means for blocking may be operative to remove at least one process of the spyware, operative to prevent forwarding data sent from the spyware to a destination thereof, etc.

The system may further comprise means for removing the spyware. The means for removing the spyware is typically operative to perform operations such as deleting the processes of the spyware; removing registry entries used by the spyware; and removing the files of the spyware from the user's computer, and can be carried out by an agent (i.e. a programmed entity) at the user's computer operative at the user's computer, or by an administrator via remote administration tools.

BRIEF DESCRIPTION OF THE DRAWINGS

The present invention may be better understood in conjunction with the following figures:

FIG. 1 schematically illustrates data sent from a victim's computer by spyware.

DETAILED DESCRIPTION OF PREFERRED EMBODIMENTS

FIG. 1 schematically illustrates data sent from a victim's computer by spyware. The data comprises information about the user's computer as follows:

"uname=5.1.2600. Service+Pack+2" specifies the service pack which is installed on user's computer (a service pack is an update to a software version that fixes existing problems, such as a bugs)

"version=12" specifies the version of the service pack

"eth0=10.8.11.212" specifies the client NAT (Network Address Translation) IP address within the LAN, and on which network card (i.e. eth0).

"port0=21046&port1=18870" which specifies the port at which the spyware is monitoring incoming traffic.

Spyware also reports information about the operating system of the victim computer, such as processes, installed programs, program version, which programs are loaded on computer's startup, and so forth. This is extremely dangerous, since it enables malicious objects to figure out which programs defend the victim system.

Figure 2:
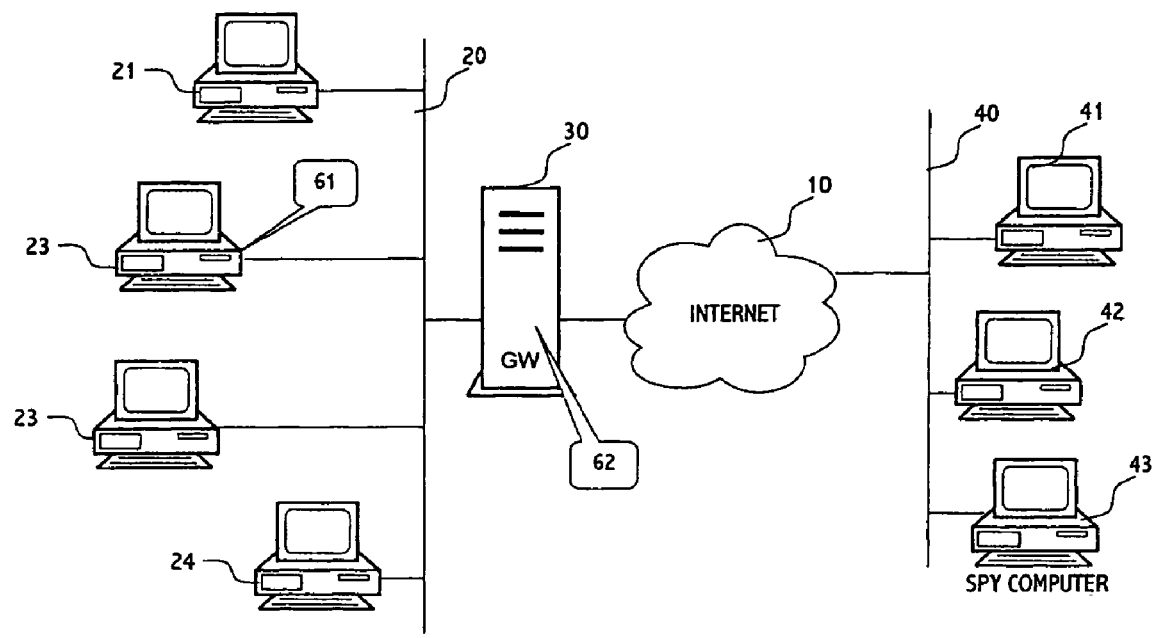
FIG. 2 schematically illustrates a system that may be used for implementing the present invention.

FIG. 2 schematically illustrates a system that may be used for implementing the present invention. The computers 21, 22 and 23 are connected to the local area network 20. The local area network 20 is connected to the Internet 10. The gateway server 30 is interposed between the local area network 20 and the Internet 10.

Typically the spy computer 43 is connected to the local area network 40, along with other computers 41 and 42. Information from a victim computer 23 is sent through the Internet to the spy computer 43 (referred to also as spyware home base).

One characteristic that distinguishes spyware from other forms of maliciousness, such as viruses, spam and adware, is that spyware sends information from a victim computer, while the other forms typically send information to the victim computer. Thus, according to the present invention, in order to detect spyware activity on a computer, the points of detecting spyware activity is where outgoing data of a computer can be monitored. These points are at the user's computer, which is marked in FIG. 2 as 61, and/or at the gateway server, which is marked in FIG. 2 as 62. It should be noted that the difference between point 61 and point 62 is that at point 61 the outgoing data can be directed either to another computer on the LAN (Local Area Network) 20 or to the "outside world" (i.e. out of the LAN 20), while at point 62 the outgoing data can be directed only to the "outside world".

Figure 3:
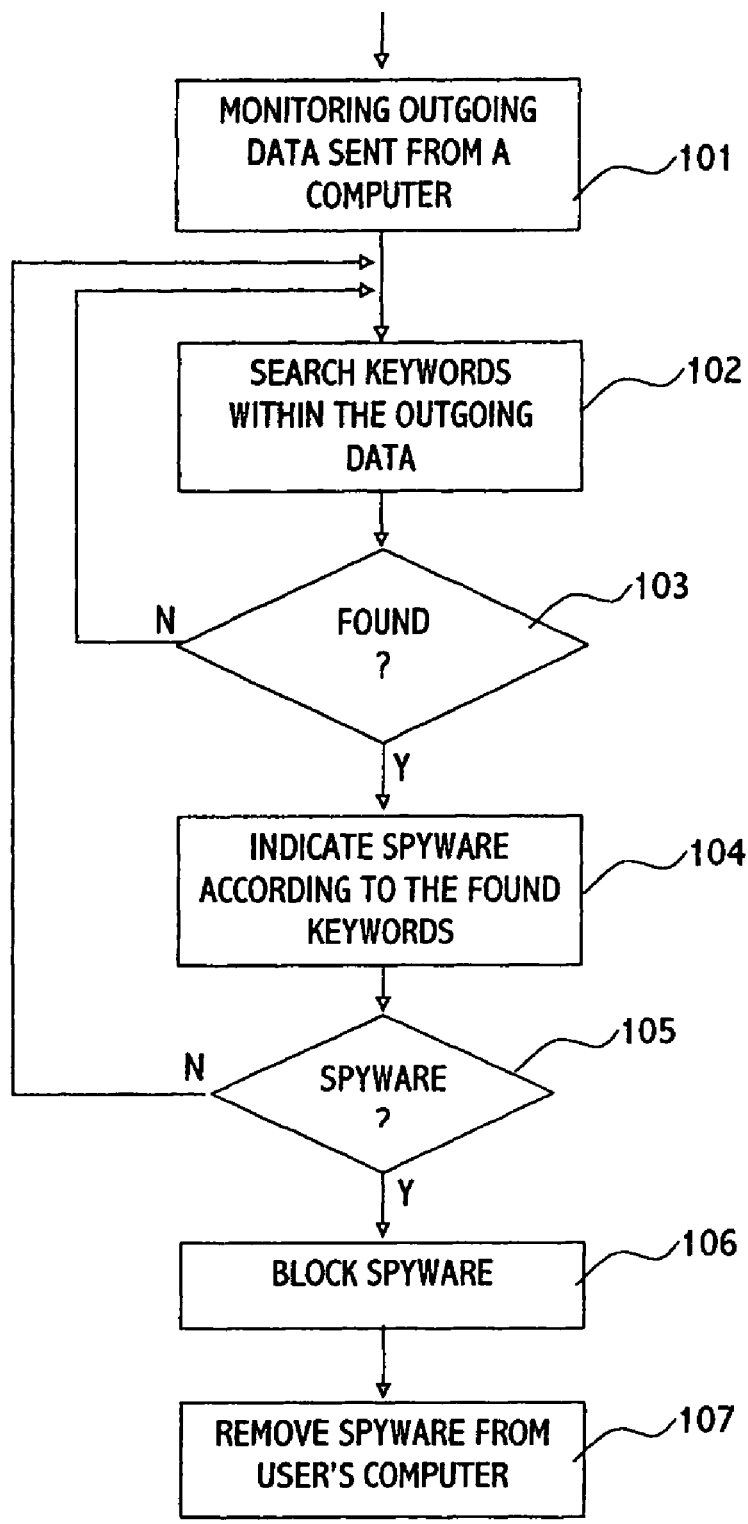
FIG. 3 is a flowchart of a method for detecting spyware, according to a preferred embodiment of the invention.

FIG. 3 is a flowchart of a method for detecting spyware, according to a preferred embodiment of the invention.

At block 101, outgoing data sent from a computer is monitored.

At block 102, the monitored data is scanned in order to detect keywords that may indicate spyware activity. The keywords subject is described hereinafter.

From block 103, if no keywords have been found, then flow continues to block 102, i.e. the search for keywords is repeated after new data is sent out from the user's computer; otherwise flow continues to block 104.

At block 104 the found keywords are tested in order to indicate spyware activity, as will be specified hereinafter.

From block 105, if the found keywords indicate spyware activity, then according to a preferred embodiment of the invention on block 106 the spyware is blocked, and according to another or further embodiment of the invention on block 107 the spyware is removed from the user's computer.

The term "keyword" refers herein to a string. A keyword may have meaning, such as a name and address, but also can be meaningless, such as encrypted text.

According to a preferred embodiment of the present invention, spyware activity is indicated by the presence of certain keyword(s) in outgoing data from a user's computer, or from a LAN to which the user is connected. For example, there is no reason for sending the internal IP address of the user on the LAN (the "internal" IP address) to the outside world. Thus, if the internal IP address of a user is detected on the outgoing data from the LAN he is connected to, it indicates spyware activity in his computer. Spyware activity may be indicated also by a plurality of keywords, and also by a combination of keywords. Moreover, the destination of the data, which is also a keyword, may also indicate spyware activity, especially if the destination of the data is an address which is known as a home base of spyware.

It should be noted that the found keywords, especially if the keywords are a spyware signature (explained hereinafter), may identify a certain spyware, and accordingly use prior information of the spyware, such as which programs it employs, which registry entries are accessed, which processes are used by the spyware, etc. However, in some cases keywords indicate only the presence of spyware, but do not identify a spyware. In this case, the spyware may be tested in a laboratory in the same manner as a virus, and its characteristic keywords may be detected, such as its signature, home base, etc.

The indication place (i.e. at the user's computer or at the gateway) also has meaning, as explained hereinabove. Some keywords may be sent to a destination within the local network, and it still may be considered as "legitimate"; however, if these keywords are sent to the outside world, it may indicate spyware activity.

According to a preferred embodiment of the invention, some keywords are used as baits. For example, a dummy address in an address book, especially with no meaning, such as a random string. When one or more bait keywords are present in the outgoing data from a user's computer, it indicates spyware activity.

One of the methods used by spyware applications to track a user's activity is tracing the keystrokes on the user's computer. From the technical point of view, the list of keystrokes and/or their associated characters are stored in a buffer, until being processed by the operating system. According to one embodiment of the invention a bait string is inserted in the keystrokes buffer. Thus, if the bait string is detected on the outgoing data from a user's computer, it indicates spyware activity.

Spyware may also encrypt the information sent out from a user's computer. In this case, meaningful keywords may be useless. Nevertheless, a research carried out by Aladdin Knowledge Systems Ltd. has found that a signature of said spyware, such as a virus signature, may be used for indicating a software component as spyware, and consequently executing and/or accessing said component can indicate spyware activity.

According to one embodiment of the invention, upon detecting spyware activity at a user's computer, the spyware communication is blocked at the user's computer and/or at the gateway computer to which the user's computer is connected to.

Blocking spyware communication at the user's computer can be carried out, for example, by not sending data from said spyware to a destination thereof, not sending data only to a known spyware home base, etc.

Removing spyware from a user's computer is not trivial, especially since spyware creators are aware of attempts to remove it from a user's computer, and therefore they design the spyware to confront such attempts. For example, spyware used to change the list of the startup applications (which is on the registry of a computer). Thus, one of the acts of disabling spyware is to erase the spyware from the list of the startup programs from the registry. However, since spyware creators are aware of this point, spyware applications are used to check once in a while if the spyware is on the startup list, and if not, the spyware adds it to the list. According to one embodiment of the invention, once a spyware has been identified, its processes are aborted, and then the relevant data is removed from the registry entries. Removing the spyware from the user's computer is mostly recommended since a spyware application can be activated by another program.

Figure 4:
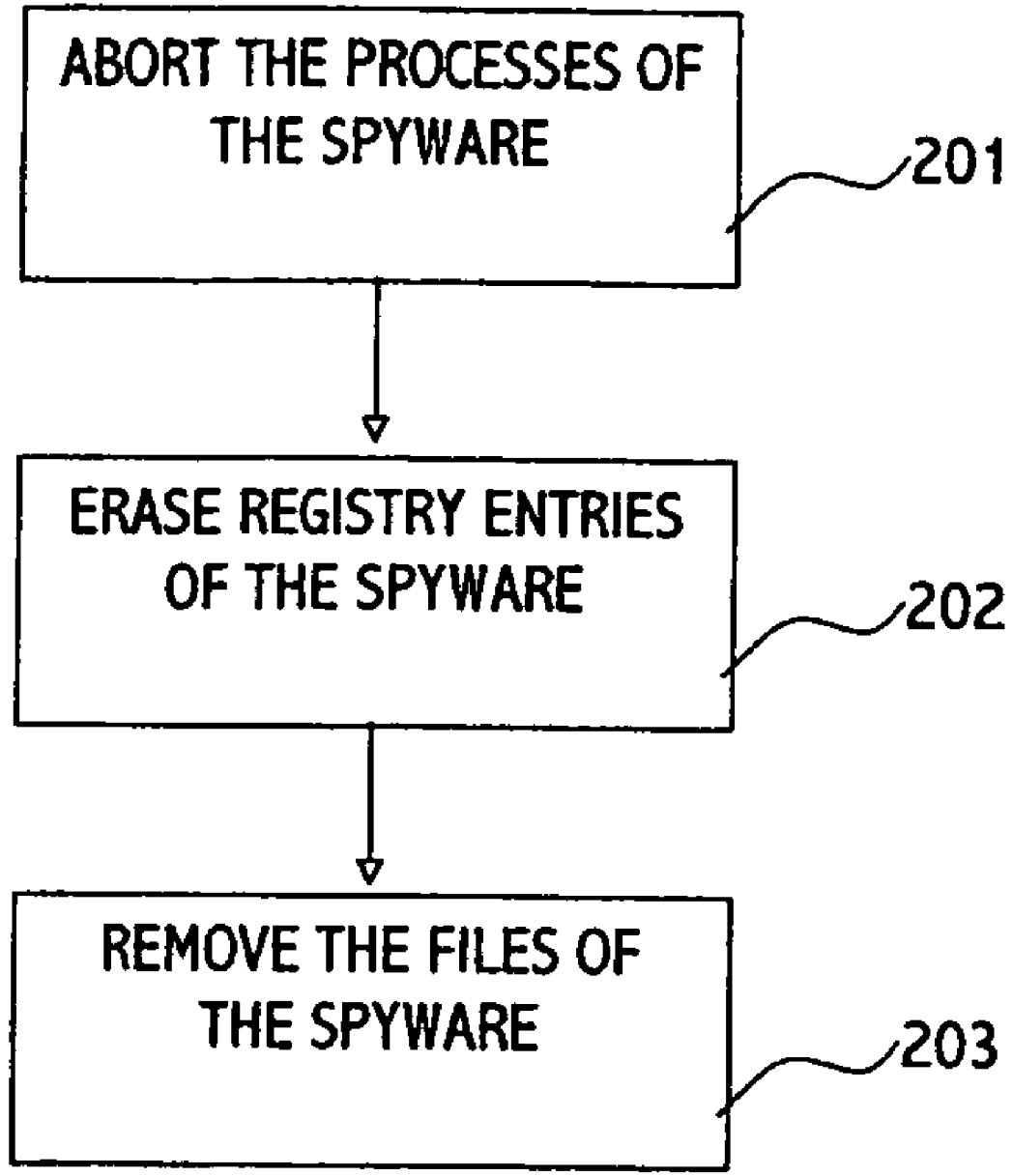
FIG. 4 is a flowchart of a method for removing an identified spyware from a user's computer, according to a preferred embodiment of the invention.

FIG. 4 is a flowchart of a method for removing an identified spyware from a user's computer, according to a preferred embodiment of the invention.

At block 201, the processes of the spyware are aborted, thereby de-activating the spyware, at least until the next boot.

At block 202, the registry entries which have relevance to the spyware are erased, thereby preventing re-activating the spyware program.

At block 203, the files of the spyware are removed from the user's computer, thereby preventing another application to re-activate the spyware.

According to one embodiment of the invention, removing a spyware application from a user's computer can be carried out by an agent operating on the user's computer, such as an application program. According to another embodiment of the invention, the spyware is removed from a remote location by an administrator with Microsoft Management Infrastructure or alike, which can get administrative priority on the user's computer.

The majority of the data sent by spyware is HTTP data through port 80; however spyware can use also other ports and other protocols. For example, spyware sends information on TCP protocol also, which means that the data transfer can be carried out through any random port, not only port 80 which is the one used by the HTTP protocol.

The seventh layer of the OSI communication module is the layer that supports application and end-user processes. At this layer the communication partners can be identified, quality of service can be detected, user authentication and privacy can be taken in consideration, and any constraints on data syntax can be checked. This layer provides application services for file transfers, email, and other network software services. TELNET and FTP are applications that exist entirely in the application layer. Tiered application architectures are part of this layer. As such, detecting and blocking spyware can be carried out on the application layer.

The detection of spyware can be carried out by existence of certain keywords within the fields of specific HTTP packet header identifiers such as "GET", "HOST" and "User-Agent", as illustrated in FIG. 1. Spyware blocking can be carried out by not performing commands such as "GET". The meaning of these commands is:

"GET" is an HTTP request for a specified resource. For example:
GET/weatherscope/WeatherscopeSetup.exe HTTP/1.1
"User-Agent" is information field specifying the program the generated the http request. For example:
User-Agent: GainPI/1101

"HOST" specifies to which host the HTTP request is referred. For example:
Host: download.gainpublishing.com
Connection: Keep-Alive
Cache-Control: no-cache Those skilled in the art will appreciate that the invention can be embodied by other forms and ways, without losing the scope of the invention. The embodiments described herein should be considered as illustrative and not restrictive.

The invention claimed is:

1. A method for detecting spyware activity in a system including a user's computer connected to gateway server via a local area network (LAN), the method comprising:
    monitoring, by the gateway server connected to the user's computer via the LAN, outgoing communication data sent from the user's computer to the Internet via the gateway server;
    searching, by the gateway server for at least one bait keyword within said communication data; and
    indicating, by the gateway server, spyware activity in the user's computer by presence of at least one of said bait keyword within said communication data; and
    in response to said indicated spyware activity, automatically blocking, by the gateway server, said outgoing communication data by preventing a forwarding of said outgoing data sent by spyware of the indicated activity to its destination.

2. A method according to claim 1, further comprising the step of removing said spyware from said user's computer.

3. The system of claim 1 wherein the keyword searching includes searching for at least one predefined keyword.

4. The method of claim 1 wherein:
    i) the keyword searching by the gateway server includes searching for a presence of at least one internal IP address; and
    ii) the blocking is done in accordance with the detecting, by the gateway server, of the presence of the at least one internal IP address.

5. A system for detecting spyware activity, the system comprising:
    means for monitoring outgoing communication data sent from a user's computer to the Internet via a gateway server, said monitoring means being located at said gateway server;
    means for searching at least one bait keyword within said communication data;
    means for indicating spyware activity in said user's computer by presence of at least one of said bait keyword within said communication data, and
    at least one of:
    i) blocking means for blocking communication from said computer upon detecting a spyware activity in said user's computer by preventing forwarding of said communication data to a destination thereof and
    ii) removing means for removing said spyware upon detecting said spyware activity in said user's computer.

6. A system according to claim 5, wherein said means for blocking is operative to prevent forwarding data sent from said spyware to a destination thereof.

7. The system of claim 5 wherein the system comprises the blocking means.

8. The system of claim 5 wherein the system comprises the removing means.

9. The system of claim 5 wherein said means for searching is configured to search for at least one predefined keyword.

10. The system of claim 5 wherein said means for searching is configured to search for at least one internal IP address.

11. A method for detecting spyware activity in a system including a user's computer connected to a gateway sewer via a local area network (LAN), the method comprising:
  monitoring, by the gateway server, ongoing communication data sent from the user's computer to the Internet via the gateway server;
  searching, by the gateway server for at least one bait keyword within said communication data; and
  in response to a presence of at least one said bait keyword within said communication data as determined by said searching, automatically removing spyware by the gateway server from the user's computer.

12. The method of claim 11 wherein the keyword searching includes searching for at least one predefined keyword.

13. The method of claim 11 wherein:
  i) the keyword searching by the gateway server includes searching for a presence of at least one internal IP address; and
  ii) the spyware removing is done in accordance with the detecting, by the gateway server, of the presence of the at least one internal IP address.

14. A method according to claim 11, wherein said removing said spyware is carried out by the steps of: identifying the spyware; deleting the processes of said spyware; and removing registry entries used by said spyware.

15. A method according to claim 14, wherein said removing of said spyware further comprises: removing the files of said spyware from the user's computer.

16. A method for detecting spyware activity in a system including a user's computer connected to gateway server via a local area network (LAN), the method comprising:
  monitoring, by the gateway server connected to the user's computer via the LAN, outgoing communication data sent from the user's computer to the Internet via the gateway server;
  searching, by the gateway server for at least one keyword, other than a resource identifier, within a packet header identifier field of said communication data; and
  indicating, by the gateway server, spyware activity in the user's computer by presence of at least one of said keyword within said packet header identifier field of said communication data; and
  in response to said indicated spyware activity, automatically blocking, by the gateway server, said outgoing communication data by preventing a forwarding of said outgoing data sent by spyware of the indicated activity to its destination.

17. A system for detecting spyware activity, the system comprising:
  means for monitoring outgoing communication data sent from a user s computer to the Internet via a gateway server, said monitoring means being located at said gateway server;
  means for searching at least one keyword, other than a resource identifier, within a packet header identifier field of said communication data;
  means for indicating spyware activity in said user's computer by presence of at least one of said keyword within said packet header identifier field of said communication data, and at least one of:
  i) blocking means for blocking communication from said computer upon detecting a spyware activity in said user's computer by preventing forwarding of said communication data to a destination thereof and
  ii) removing means for removing said spyware upon detecting said spyware activity in said user's computer.

18. A method for detecting spyware activity in a system including a user's computer connected to a gateway server via a local area network (LAN), the method comprising:
  monitoring, by the gateway server, ongoing communication data sent from the user's computer to the Internet via the gateway server;
  searching, by the gateway server for at least one keyword, other than a resource identifier, within a packet header identifier field of said communication data; and
  in response to a presence of at least one said keyword within said packet header identifier field of said communication data as determined by said searching, automatically removing spyware by the gateway server from the user's computer.

* * * * *